(12) United States Patent
James et al.

(10) Patent No.: US 9,114,765 B1
(45) Date of Patent: Aug. 25, 2015

(54) DIRECT LOAD SIDE DOOR PILLAR APPLIQUE WITH INTEGRATED CHANNEL

(71) Applicant: Ford Global Technologies, LLC, Dearborn, MI (US)

(72) Inventors: Sara James, Commerce, MI (US); Paul Lawrence Lipinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/291,249

(22) Filed: May 30, 2014

(51) Int. Cl.
| | |
|---|---|
| *B60J 10/08* | (2006.01) |
| *B60R 13/04* | (2006.01) |
| *B60J 5/04* | (2006.01) |
| *F16B 5/12* | (2006.01) |

(52) U.S. Cl.
CPC .............. *B60R 13/04* (2013.01); *B60J 5/0401* (2013.01); *F16B 5/121* (2013.01)

(58) Field of Classification Search
CPC ......... B60R 13/04; B60J 5/0401; F16B 5/121
See application file for complete search history.

(56) References Cited

U.S. PATENT DOCUMENTS

| | | | |
|---|---|---|---|
| 5,092,078 A | 3/1992 | Keys | |
| 6,409,256 B1 * | 6/2002 | Page | 296/203.03 |
| 6,416,113 B1 | 7/2002 | Page | |
| 9,022,446 B2 * | 5/2015 | Zimmer et al. | 296/1.08 |
| 2010/0313487 A1 * | 12/2010 | Ellis et al. | 49/502 |
| 2012/0091751 A1 * | 4/2012 | Zimmer et al. | 296/146.9 |
| 2013/0255065 A1 | 10/2013 | Bachelder et al. | |

* cited by examiner

*Primary Examiner* — Lori L Lyjak
(74) *Attorney, Agent, or Firm* — Raymond Coppiellie; Price Heneveld LLP (57) ABSTRACT

An applique assembly for a vehicle door includes a body defining an attachment surface with an edge. The body has a margin extension member coupled with the attachment surface inward of the edge that defines a margin channel open toward the edge. The assembly also includes a margin seal having a first portion receivable within the margin channel with a second portion extending inward over and spaced apart from the margin extension member outside the margin channel.

20 Claims, 6 Drawing Sheets

DIRECT LOAD SIDE DOOR PILLAR APPLIQUE WITH INTEGRATED CHANNEL

FIELD OF THE INVENTION

The present invention generally relates to vehicle door trim appliques. An applique body is configured to be assembled to an associated vehicle door by application of a direct load prior to assembly of a seal with the applique body and over marginside edge of the vehicle door.

BACKGROUND OF THE INVENTION

Vehicle doors generally include a number of different trim pieces or elements assembled therewith. Such trim pieces can both provide a finished appearance for the exterior of the vehicle as well as a seal between adjacent movable parts of the vehicle. Among these trim pieces, vehicle doors generally include one or more applique pieces assembled in locations between the vehicle windows and adjacent doors and/or portions of the vehicle exterior. In general, applique pieces are positioned over portions of vehicle doors in the area of various pillars of the vehicle structure. For example, a front door of a vehicle may include an applique piece over a portion of the vehicle's B-pillar, and a rear vehicle door may include two applique pieces, one over another portion of the B-pillar and another applique piece over a portion of the vehicle's C-pillar. Such applique pieces are typically made of plastic material and may be, for example, a portion of an extrusion or an injection-molded unit.

Applique pieces have been developed having an extended hooked edge along a side thereof. Such applique pieces are intended to be assembled with a vehicle door by positioning an edge door within the hook portion of the applique piece and by, subsequently, rotating the applique piece into the assembled position with the door. One or more snap-fit features may be included on a portion of the applique piece opposite the hooked edge. Such features can be positioned so as to engage with appropriate receiving features formed on the vehicle door. In many instances relating to both the door structure and/or the assembly process, such applique pieces may be difficult to locate appropriately on the vehicle door prior to engagement of the snap features. Further, spacing elements installed between the applique piece and the vehicle door may make rotation of the applique piece for engagement of the snap features difficult.

Accordingly, further advances are desired in the construction of applique features associated with vehicle doors. Additionally, advances in assembly methods for such applique features with vehicle doors are desired.

SUMMARY OF THE INVENTION

According to one aspect of the present invention, an applique assembly for a vehicle door includes a body defining an attachment surface with an edge. The body has a margin extension member coupled with the attachment surface inward of the edge that defines a margin channel open toward the edge. The assembly also includes a margin seal having a first portion receivable within the margin channel with a second portion extending inward over and spaced apart from the margin extension member outside the margin channel.

According to another aspect of the present invention, a vehicle door assembly includes a door frame defining a window opening and an edge. The door frame includes a pillar section having an exterior between the edge and the opening. The assembly further includes an applique subassembly having a body coupled with the pillar section exterior. The body defines a margin channel open adjacent the door edge. The applique subassembly further includes a margin seal received within the margin channel and extending around a portion of the pillar section including the frame edge.

According to another aspect of the present invention, a method for assembling an applique to a door frame member includes positioning an attachment side of the applique adjacent to and facing an exterior of the frame member and moving the applique normal to the exterior of the frame member to engage at least one coupling feature between the applique and the frame member. The method further includes assembling a margin seal within a margin channel of the applique and over an adjacent edge of the frame member.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
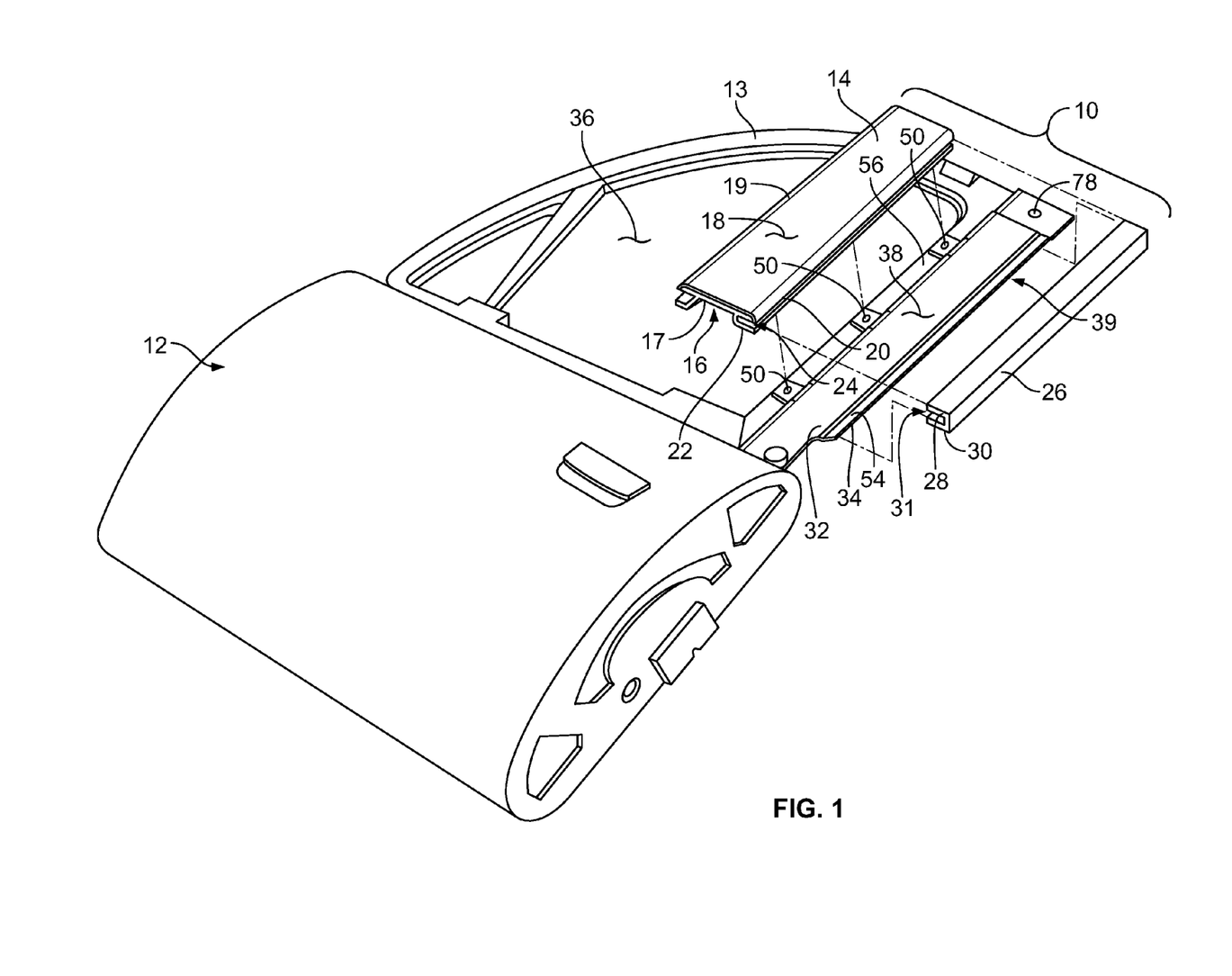
FIG. 1 is a perspective, partial cutaway view of a vehicle door assembly, including an applique assembly according to an embodiment.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring now to FIG. 1, reference numeral 10 generally designates an applique assembly for a vehicle door 12 (which is depicted herein as a generic vehicle door) according to an embodiment of the present invention. As depicted, applique assembly 10 includes an applique body 14 having an attachment surface 16, an outside surface 18 opposite the attachment surface 16, and an edge 20. A margin extension member 22 extends from attachment surface 16 (as shown in the assembled view of FIG. 3) at a location inward of edge 20 and defines a margin channel 24 that is open toward edge 20. A margin seal 26 has a first arm 28 receivable within the margin channel 24 and further includes a second arm 30 that extends outward from the margin channel 24 and over margin extension member 22. As further depicted in FIG. 1, applique assembly 10 is usable in connection with a vehicle door 12, having a door frame 13 that can be of a stamped piece of sheet metal, for example. Door frame 13 defines a window opening 36 and a margin edge 34 and includes a pillar member 32 having an outside surface 38 extending between adjacent portions of window opening 36 and margin edge 34. In such an application, applique assembly 10 can be assembled with vehicle door 12, and in particular with frame 13, by coupling applique body 14 with outside surface 38 of pillar member 32 and positioning first arm 28 of margin seal 26 within channel 24 such that second arm 30 of margin seal 26 extends around a portion of pillar member 32 including margin edge 34 such that margin seal 26 captures a portion of margin extension member 22 and an adjacent portion of pillar member 32 therebetween.

Figure 2:
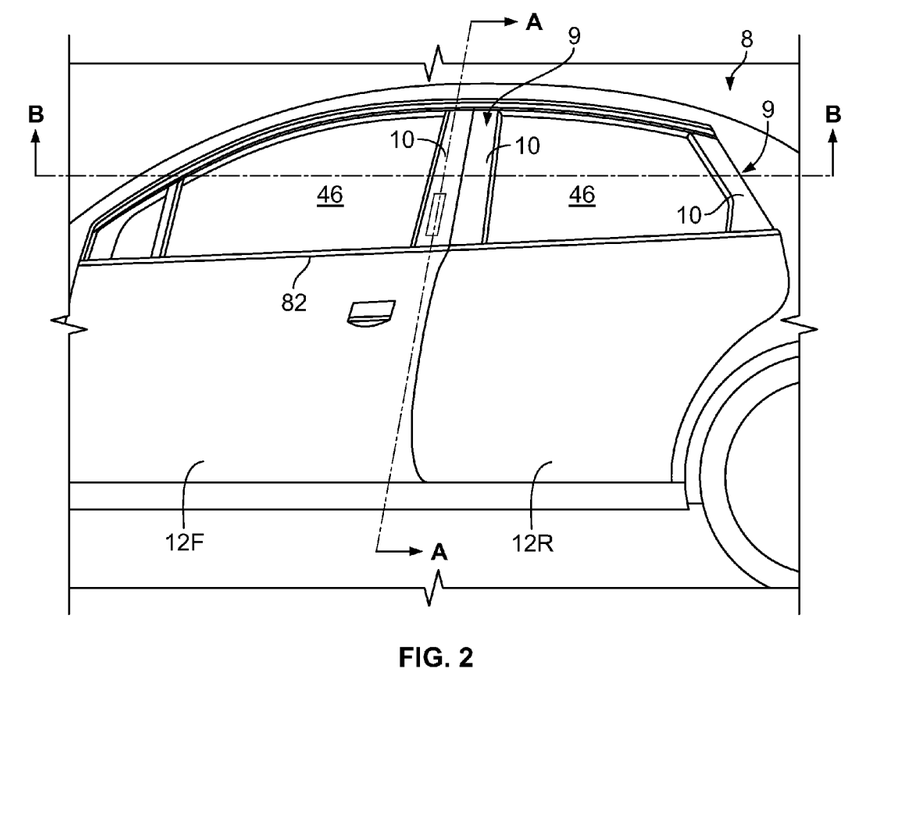
FIG. 2 is a partial side view of a vehicle including a plurality of applique assemblies, as shown in FIG. 1.

As shown in FIG. 2, a motor vehicle 8 may generally include a number of different applique assemblies 10 affixed with the various doors 12 of vehicle 8 at locations in which the doors 12 overlap the structural pillars (not shown) that are a part of the frame of vehicle 8. In this manner, applique assemblies 10 may provide both a finished visual appearance for vehicle 8, as well as sealing between vehicle doors 12 with and/or between doors 12 and adjacent portions of the exterior of vehicle 8. Applique assemblies 10 are generally shaped so as to extend between an upper edge of the associated vehicle door 12 to a location toward the midway point of vehicle door 12 that may be generally aligned with the lower edges of the window openings 36 of the vehicle doors 12. Applique assemblies 10 may further be configured to have a generally planar outer surface 18 having a width in the direction from the front of the car towards the rear of the car sufficient to both cover an adjacent edge of the associated vehicle window 46 and to extend over margin edge 34 of vehicle door 12. It is noted that the general shape of outside surface 18 of applique body 14 may be slightly curved in the direction from the bottom thereof to the top thereof, may be slightly convex in shape, or may have other variations thereof, while still being considered generally planar. Further, applique body 14 may be tapered in shape, e.g., from a greater width toward the bottom thereof to a narrower width toward the top thereof, or may otherwise vary according to the structural or design needs of vehicle 8.

Figure 3:
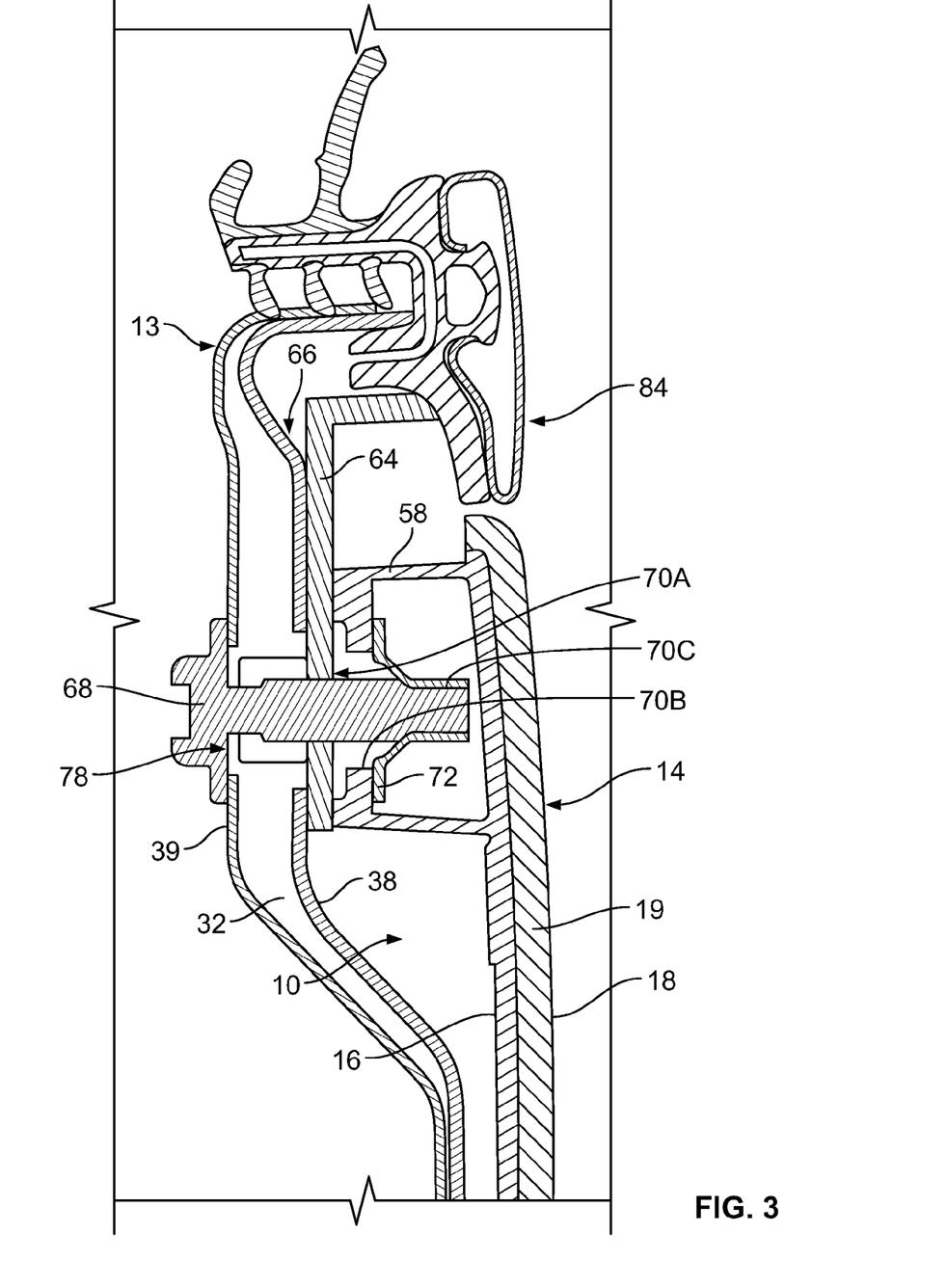
FIG. 3 is a cross-sectional view, along line B-B of FIG. 2, of two applique assemblies coupled with adjacent vehicle doors.
Figure 4:
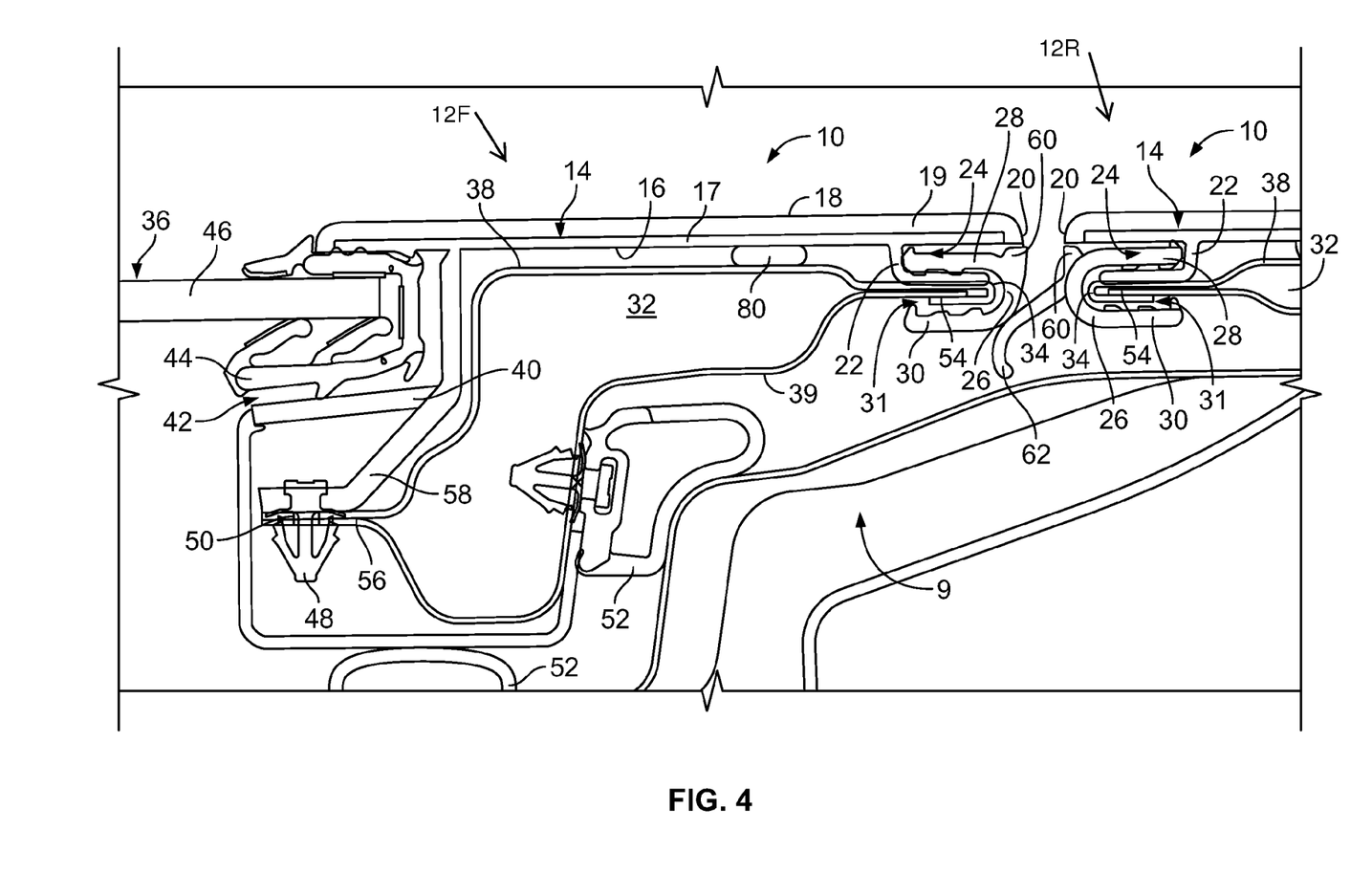
FIG. 4 is cross-sectional view, along line A-A of FIG. 2, of an applique assembly coupled with a vehicle door.

As shown in FIGS. 3-6, applique body 14 can include a number of features or structures usable to attach applique body 14 to vehicle door 12, and in particular to outside surface 38 of pillar member 32. As shown in the cross-sectional view of FIG. 3, such features can include one or more W-clips. W-clips 48 can be resiliently-deformable structures made of, for example, a polymeric material such as nylon, various plastics, or the like, which may allow W-clips 48 to provide a snap-fit attachment between components. As shown in FIG. 3, one or more W-clips 48 can be coupled with a pocket structure generally referred to as a dog house 58, which itself can extend from attachment surface 16. In general, dog house features 58, including those discussed above with reference to FIG. 3, can be integrally molded with a portion of applique body 14 and can be in the general form of hollow rectangular prisms extending away from attachment surface 16 with at least one open side so as to form a pocket or the like with an underlying portion of attachment surface 16. In an example, applique body 14 can include an inner member 17 that defines at least a major portion of attachment surface 16 and further includes dog house features 58 (as shown in FIGS. 3 and 4) integrally formed from a single piece of material, which can be a polymeric material, such as plastic or the like. Applique body 14 can further include an outer member 19 coupled with inner member 17, such as by adhesives or the like, and defining outside surface 18 of applique body 14. Outer member 19 can be formed from the same material as inner member 17 or can be formed by other different material, such as a polycarbonate and acrylonitrile butadiene styrene blend ("PCABS"), other rigid and/or high-gloss materials, or the like.

In the example shown in FIG. 3 (as well as in FIG. 6), a glass seal extension 40 can be coupled with, such as by being integrally formed with, attachment surface 16 of applique body 14, and the dog houses 58 with which W-clips 48 are coupled can extend from attachment surface 16 by further being positioned on glass seal extension 40.

Glass seal extension 40 can extend from attachment surface 16 of applique body 14 on a side of applique body 14 opposite margin extension member 22, and can be sized so as to extend into an inset portion of outside surface 38 of pillar member 32 adjacent window opening 36. Further, glass seal extension 40 can be shaped so as to form a glass seal channel 42 with an adjacent portion of attachment surface 16 that can receive a glass seal insert 44 therein, which can receive and guide an adjacent edge of window 46 therein during open and closing of window 46, as well as provide a seal between window 46 and vehicle door 12.

The dog house feature 58 with which W-clip 48 is coupled can further extend away from attachment surface 16 to be positionable in contact with a glass-side door seam 56 along which a portion of window opening 36 is defined. Glass-side door seam 56 can include a hole 50 therein sized to receive W-clip 48 by a snap- or press-fit engagement therewith. Such dog houses 58 and associated W-clips 48 can be provided at various locations along glass seal extension 40, as illustrated in FIGS. 1 and 6, and corresponding holes 50 can be formed in glass-side door seam 56

As shown in FIG. 4, applique body 14 can be configured to receive one or more threaded fasteners therein for further coupling with vehicle door 12. As shown, such a threaded fastener can be in the form of a screw 68, which passes through a hole 50 in pillar member 32, with the head thereof disposed over inside surface 39 of pillar member 32. An additional dog house 58 can extend from attachment surface 16 of applique body 14 to contact outside surface 38 in the area of the hole 50 within which screw 68 is received. As further shown in the figures, dog houses 58 can extend away from attachment surface 16 by varying distances according to the particular locations thereof so as to space apart areas of attachment surface 16 from outside surface 38 of pillar member 32 and to appropriately position the various additional features of applique body 14, including margin extension member 22, glass seal extension 40, and outside surface 18 with respect to vehicle door 12. Further, dog houses 58 can be sized to appropriately receive the attachment feature, such as those described above, to be used in connection therewith.

Figure 5:
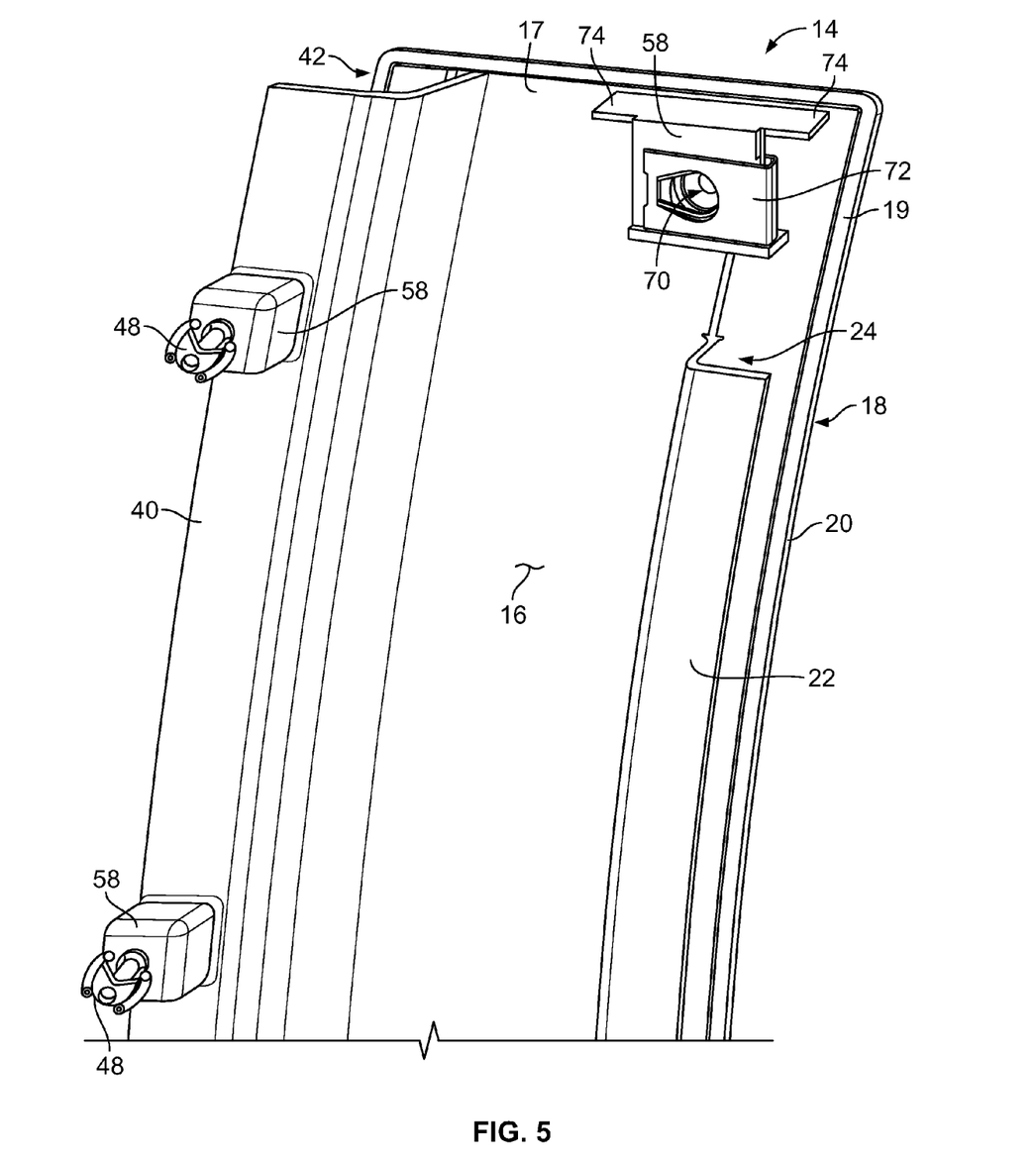
FIG. 5 is a perspective view of a vehicle door and an attachment feature for coupling an applique assembly according to FIG. 1 with the door.

As shown in FIGS. 4 and 5, an insert 64 can be assembled with vehicle door 12 along an upper portion of pillar member 32 and in the location of the hole 50 within which screw 68 is received such that a corresponding hole 65 in insert 64 aligns therewith. As shown, insert 64 can be received within an upper seal channel 66 of vehicle door 12 at an intersection thereof with pillar member 32. Insert 64 can be configured to receive at least a portion of dog house 58 therein for alignment of dog house 58 with hole 50 to facilitate assembly with screw 68 therewith. As shown in FIG. 5, insert 64 can include one or more slots 76 that can align with mating flanges 74 formed on the dog house 58 associated with screw 68 so as to extend outwardly therefrom. During assembly of applique body 14 with pillar member 32, flanges 74 can slide within slots 76 to properly locate dog house 58 within insert 64.

Figure 6:
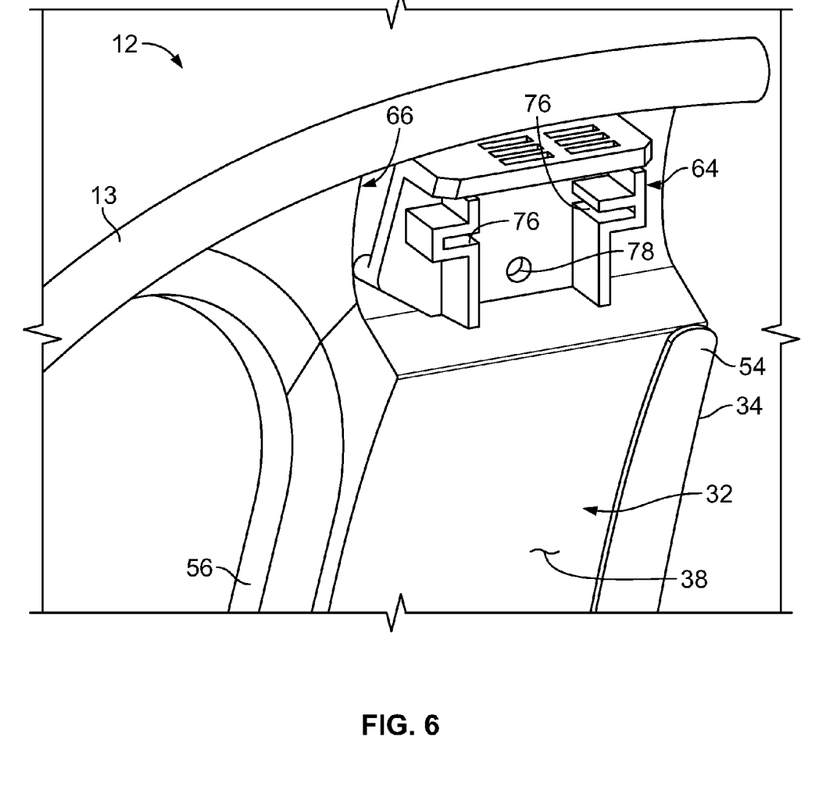
FIG. 6 is a perspective view of an applique body portion of the applique assembly of FIG. 1.

As shown in FIGS. 4 and 6, the threaded hole 70 associated with screw 68 may be included on a clip 72 configured to be assembled with dog house 58. Clip 72 may be configured as a resiliently deformable body that can be coupled with dog house 58 extending both inside and outside of dog house 58 on a wall thereof. Clip 72 can be of a plastic material so as to be somewhat resiliently flexible, and can be formed somewhat undersized relative to the associated wall of dog house 58 so as to deform outwardly slightly when assembled therewith such that clip 72 is at least provisionally retained on the associated wall of dog house 58. Such provisional attachment can maintain clip 72 in an assembled arrangement with dog house 58 during transportation and assembly of applique body 14.

As further shown in FIGS. 4 and 6, the structure of threaded hole 70 can include a number of distinct aligned hole portions of both clip 72 and dog house 58. In the example shown, a first through portion 70A can extend through clip 72 on the side thereof positioned outside of dog house 58. A second through portion 70B can extend through an aligned portion of dog house 58, and a threaded portion 70C can be formed on the portion of clip 72 disposed within dog house 58. As such, screw 68 can pass through hole 78 in vehicle door 12, and also through the unthreaded portions 70A and 70B of hole 70 to engage with the threaded portion 70C, thereby applying a retention force through the stacked components. In another example, the portion 70C of hole 70 disposed within dog house 58 can be initially unthreaded and configured to be made threaded, such as by engagement of a self-tapping screw 68 therewith during assembly of applique body 14 onto pillar member 32.

As shown in FIG. 6, the location of threaded hole 70 can be positioned closer to edge 20 than to the opposite edge of applique body 14 adjacent to glass seal extension 40. This arrangement can provide a force to balance those provided by W-clips 48 adjacent glass-side door seam 56, and can further provide a force to retain margin extension member 22 against an adjacent portion of outside surface 38 of pillar member 32, as shown in FIG. 3 and discussed further below.

One or more foam inserts 80 can be coupled with attachment surface 16 of applique body 14 so as to be positionable between attachment surface 16 and outside surface 38 of pillar member 32. In this arrangement, foam insert 80 can be compressible between attachment surface 16 and outside surface 38 when applique body 14 is assembled with pillar member 32 so as to provide an opposing force against the forces provided by W-clips 48 and screw 68. This, in turn, can help maintain W-clips 48 in a fully-engaged position with respect to glass-side door seam 56, and can further provide a soft-touch feel for a fully-assembled applique assembly 10 and can further prevent rattling or other undesirable characteristics from a somewhat loose fit of applique body 14 against pillar member 32.

Applique body 14 can further be retained against vehicle door 12 at a lower end thereof by additional features associated with vehicle door 12. In an example shown in FIG. 2, vehicle door 12 can include a belt line trim member 82 disposed so as to extend along the lower edge of window opening 36 in door 12. Applique body 14 can be configured so as to extend vertically downward beyond belt line trim member 82 so as to be positioned between belt line trim member 82 and an adjacent portion of pillar member 32 (or another adjacent portion of the frame associated with vehicle door 12). Belt line trim member 82 can be secured with vehicle door 12 along a lower portion of pillar member 32 or an adjacent feature of the frame of door 12 by a fastener such as a screw, or a W-clip as described above. Applique body 14, in such an example, can include a cut-out or a through hole aligned with such a fastener so that belt line trim member 82 can be affixed with vehicle door 12 capturing the lower portion of applique body 14 therebetween. In another example, the lower end of applique body 14 can be coupled with pillar member 32 by a W-clip 48 or a threaded attachment (with or without an appropriately-configured insert) similar to that described above with respect to FIGS. 3 and 4).

Returning now to FIG. 3, margin seal 26 is included in applique assembly 10 (FIG. 1) and is assemblable with both applique body 14 and with the adjacent portion of pillar member 32 to provide additional structural retention of applique assembly 10 with vehicle door 12 and/or to help seal the cavity created between attachment surface 16 and outside surface 38 of pillar member 32. Margin seal 26 can also provide a finished appearance for the completed assembly of applique assembly 10 and vehicle door 12. As shown, margin seal 26 is an elongate member having a generally U-shaped cross-section, as can be seen in FIG. 3. In an embodiment, margin seal 26 can be a section of an extrusion having the desired profile for margin seal 26, as described further herein. Such an extrusion can be of a resiliently compressible material and can further be resiliently deformable and capable of providing a seal against an adjacent surface. In one example, margin seal 26 can be an extrusion of ethylene propylene diene monomer ("EPDM") rubber or a similar polymeric rubber material such as thermal plastic elastomer ("TPE"), neoprene, silicon-based thermoformable plastics, or the like.

The above-noted U-shaped profile of margin seal 26 can be such that margin seal 26 includes a first arm 28 and a second arm 30 extending generally parallel to each other in the same direction and spaced apart from each other so as to define a gap 31 therebetween. In this arrangement, margin seal 26 can be assembled with applique body 14 with first arm 28 received within margin channel 24, as defined between margin extension member 22 and an underlying portion of assembly surface 16. The remaining portion of margin seal 26 can extend from out of margin channel 24 with both a portion of margin extension member 22 and a portion of margin side door seam 54, including margin edge 34, received within gap 31. Second arm 30 can, thusly, extend along a portion of margin side door seam 54 defined on inside surface 38 of pillar member 32 in contact therewith so as to provide a sealed arrangement.

As discussed above, margin extension member 22 can be integrally formed with applique body 14 so as to extend away from attachment surface 16 along a first portion thereof, and to further extend generally parallel to attachment surface 16 along a second portion thereof, so as to define margin channel 24 therebetween. Further, margin extension member 22 can be shaped so as to provide appropriate support and/or spacing for the remainder of applique body 14 with respect to outside surface 38 of pillar member 32. This can include contributing to the relative positioning and alignment of the above-described attachment features, and can further include establishing appropriate spacing between attachment surface 16 and outside surface 38, as shown in FIG. 3 and/or a desired alignment of outside surface 18 of applique body 14 with respect to vehicle door 12. Accordingly, the particular width of margin channel 24 (i.e., the distance between attachment surface 16 and the portion of margin extension member 22 that extends generally parallel therewith) may vary depending on either or both of a particular configuration of applique body 14 and pillar member 32. The particular shape of the above-described profile of margin seal 26 can, accordingly, vary as needed with respect to the desired width of margin channel 24 so as to be received in a press-fit arrangement therein. In such an arrangement, first arm 28 of margin seal 26 may be somewhat oversized compared to the width of margin channel 24 and/or may include a plurality of features or sections wherein the width of first arm 24 varies to provide the desired press-fit within margin channel 24. Further, an unassembled, or original, shape for the profile of margin seal 26 can be adjusted to compensate for compression of the first arm 28 during assembly within margin channel 24.

Gap 31 defined between first arm 28 and second arm 30 can be configured to capture both a portion of margin extension member 22 and the adjacent portion of margin side door seam 54 therebetween and to apply some amount of pressure thereto. As such, all or a portion of gap 31 may be somewhat undersized relative to the combined thickness of the captured portions of both margin extension member 22 and the associated portion of glass-side door seam 56. The unassembled shape of the profile of margin seal 26 may also be configured to compensate for any widening of gap 31 to receive margin extension member 22 and margin side door seam 54 therein.

Both margin seal 26 and applique body 14 can be configured so as to provide a generally smooth transition therebetween. In this arrangement, applique body 14 can be such that edge 20 thereof is positioned beyond margin edge 34 of pillar member 32, such as approximately by the thickness of the portion of margin seal 26 that extends between first arm 28 and second arm 30. Further, margin seal 26 can include an applique seal tab 60 along an outer profile thereof that extends along the length of margin seal 26 and further extends away from margin channel 24 and into a substantially flush contact with a mating portion of attachment surface 16. This arrangement can further help establish the sealed arrangement between margin seal 26 and applique body 14 and can provide the above-noted finished look of applique assembly 10 when assembled with vehicle door 12. Both margin seal 26 and margin extension member 22 can be configured to extend in a generally vertical direction along vehicle door 12 to cover any open area between other exterior seals of vehicle door 12 (e.g. belt line trim 82 and upper window seal 84). As such, margin seal 26 may extend through approximately all or somewhat less than all of an exposed portion of margin edge 34 of vehicle door 12 defined on pillar member 32.

As further shown in FIG. 4, one of two adjacent margin seals 26 formed on adjacent vehicle doors 12, such as front door 12F and rear door 12R, can be configured with different cross-sectional profiles so as to provide a mating sealed arrangement therebetween. In the example shown in FIG. 3, margin seal 26 assembled with rear door 12R can include a seal extension 62 integrally formed therewith and extending opposite gap 31 in a direction toward the other margin seal 26, coupled with front door 12F. Seal extension 62 can be shaped so as to extend to a position that contacts the margin seal 26 coupled with front door 12F, when both front door 12F and rear door 12R are in the closed position. Such contact can result in a deformation of a seal extension 62 such that seal extension 62 provides pressure against the margin seal 26 coupled with front door 12F, so as to both physically and visually seal the associated applique assemblies 10. The seal provided by this arrangement can be so as to generally obscure any portion of pillar 9 between doors 12F and 12R (which in the example of FIG. 4 may be generally referred to as the "B-pillar") from view from of the outside of vehicle 8, as well as to help prevent water or air from entering any area defined between pillar members 32 and pillar 9 (with other doors seals 52 providing for a seal closure of doors 12F and 12R with adjacent portions of the frame 13 of vehicle 8). It is noted that the presence of any extension from or addition to the inner or outer profiles of margin seal 26 is considered in addition to the general U-shape of margin seal 26, and any margin seal 26 including such an extension (e.g., seal extension 62) is still generally considered to have a U-shape.

A method of assembling an applique assembly 10 with vehicle door 12 according to another embodiment of the present invention is now described with respect to FIG. 1. In such a manner, applique body 14 can be aligned with pillar member 32 of vehicle door 12. In such an alignment, applique body 14 can be positioned relative to pillar member 32 with attachment surface 16 thereof generally aligned with and generally parallel to (e.g., within about 10 degrees of parallel to) outside surface 38 of pillar member 32, and with any attachment features, such as W-clips 48 and holes 50, appropriately aligned. Such attachment features can be brought into mutual contact by movement of applique body 14 in a direction generally normal to outside surface 38 of pillar member 32 under a sufficient force so as to cause engagement of the respected portions of such attachment features. This can include a force sufficient to force W-clips 48 to deform and pass through the corresponding holes 50 in pillar member 32 and can continue such that the adjacent portions of applique body 14 itself, such as the adjacent portions of dog house features 58, as described above, contact the area of pillar member 32 surrounding holes 50, at which point W-clips 48 become free to expand, thusly capturing a portion of glass-side door seam 56 and at least partially securing applique body 14 against pillar member 32. As discussed above, such engagement can also include sliding motion of alignment flanges 74 into the corresponding alignment slots 76 of attachment insert 64, resulting in the above-described alignment of threaded hole 70 with the corresponding through hole 78 in door 12. The use of such snap- or press-fit features for attachment between applique body 14 and pillar member 32 can provide for both structural coupling therebetween, as well as for provisional attachment and/or locating of applique body 14 in a desired position with respect to vehicle door 12 before or during assembly of additional attachment features therebetween.

Subsequently, any rigid fasteners intended to be used to affix applique body 14 with pillar member 32, such as described above, can be assembled with the corresponding features. For example, screw 68 can be positioned within through hole 78 in vehicle door 12 and further within through hole 65 in insert 64 and can be turned into engagement with threaded hole 70. Either before or after assembly of any rigid attachment features, margin seal 26 can be assembled with applique body 14. As described above, this can include press-fitting of first arm 28 within margin channel 24, and corresponding fitting of margin side door seam 54 in the contacting portion of margin extension member 22 within gap 31 such that second arm 30 of margin seal 26 extends along the portion of inside surface 39 of pillar member 32 in the general area of margin side door seam 54.

In one example of the present applique assembly 10, glass seal insert 44 can be pre-assembled within glass seal channel 42 of applique body 14, and the above-described assembly of applique body 14 onto pillar member 32 can, accordingly, appropriately position glass seal insert 44 with respect to the intended position of vehicle window 46. In another example glass seal insert 44 can be assembled either prior to or after assembly of margin seal 26 with margin channel 24. In general, either margin seal 26 or glass seal insert 44 can be assembled with their respective channels 24, 42 by a force applied thereto in a direction generally perpendicular to that which is applied to assemble applique body 14 with pillar member 32. Such assembly can further be done by hand, or by using appropriately-configured tooling or fixtures.

The assembly steps described above for assembling applique assembly 10 with vehicle door 12 can be repeated, as necessary for additional applique assemblies 10 on the same or additional vehicle doors 12, as depicted in FIG. 2. For example, as shown in FIG. 2, rear door 12R in the finished state includes an applique assembly 10 affixed over a pillar member 32 (not shown) disposed toward the front of vehicle 8, as well as an applique assembly 10 assembled with another pillar member 32 (not shown) disposed toward the rear of vehicle 8 (i.e., over respective portions of the B-pillar and the C-pillar). Although in the example shown in FIG. 2, the applique assembly 10 associated the C-pillar of vehicle 8, is shown having a somewhat different shape than the example of applique assembly 10 shown in FIG. 1, similar attachment structures may be used to attach either applique assembly 10 with the respective pillar members 32, and such assembly may be done by a method similar to that which is described above.

After the above-described assembly of applique body 14 will pillar member 32 and subsequent assembly of margin seal 26 with applique body 14 in vehicle door 12, additional trim elements, such as upper window seal 84 and belt line trim member 82 can be assembled with vehicle door 12 including the assembly of belt line trim member 82 with vehicle door 12 so as to capture a portion of applique body 14 thereunder for further securing of applique assembly 10 to vehicle door 12. In some examples, belt line trim member 82 and applique body 14 can be configured such that belt line trim member 82 can be assembled with vehicle door 12 prior to assembly of applique body 14 with pillar member 32 to achieve similar attachment.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An applique assembly for a vehicle door, comprising:
   a body defining an attachment surface with an edge, and including a margin extension member coupled with the attachment surface inward of the edge and defining a margin channel open toward the edge; and
   a margin seal having a first portion receivable within the margin channel with a second portion extending inward over and spaced apart from the margin extension member outside the margin channel.

2. The applique assembly of claim 1, wherein the body includes a plurality of attachment structures distributed along and coupled with the attachment surface.

3. The applique assembly of claim 2, wherein the attachment structures include at least one doghouse extending from the attachment surface.

4. The applique assembly of claim 2, wherein at least one of the attachment structures includes a threaded hole.

5. The applique assembly of claim 1, wherein the edge is a first edge, the body further defining a second edge opposite the first edge and further including a seal extension member coupled with the attachment surface inward of the second edge and defining a glass seal channel open toward the second edge.

6. The applique assembly of claim 5, wherein the margin channel has a first width, and the glass seal channel has a second with that is greater than the first width.

7. The applique assembly of claim 5, further including a glass seal receivable within the window seal channel.

8. The applique assembly of claim 1, wherein the margin seal is a generally U-shaped extrusion of EPDM rubber.

9. A vehicle door assembly, comprising:
   a door frame defining a window opening and an edge and including a pillar member having an exterior between the edge and the opening;

an applique subassembly, comprising:
- a body coupled with the pillar member exterior and defining a margin channel open adjacent the frame edge; and
- a margin seal received within the margin channel and extending around a portion of the pillar section including the frame edge.

10. The assembly of claim 9, wherein the body of the applique subassembly defines an attachment side disposed toward the pillar member exterior, the body further including a plurality of attachment features spaced along the attachment side thereof, the body of the applique subassembly being coupled with the pillar member exterior by the plurality of attachment features.

11. The assembly of claim 10, wherein at least one of the attachment features is a clip having a base coupled with the applique and a deformable end received within a hole in the pillar member.

12. The assembly of claim 11, wherein the applique body includes an extension member on the attachment side that defines a glass seal channel open to the window opening, and wherein the base of the clip is coupled with the extension arm outside the glass seal channel.

13. The assembly of claim 10, wherein at least one of the attachment features is a screw received within a threaded hole on the applique.

14. The assembly of claim 13, wherein the threaded hole is defined in a clip attached with a wall of a doghouse extending from the body on the attachment side thereof.

15. The assembly of claim 13, wherein the screw couples the applique to the pillar member by passing through a hole in an insert received within an upper seal channel of the frame and engaging with the threaded hole.

16. A method for assembling an applique to a door frame member, comprising:
- positioning an attachment side of the applique adjacent to and facing a surface of the member;
- moving the applique normal to the surface of the member to engage at least one coupling feature between the applique and the member; and
- assembling a margin seal within a margin channel of the applique and over an adjacent edge of the member.

17. The method of claim 16, wherein:
the margin seal is a generally U-shaped extrusion;
the margin channel of the applique is defined by an extension member coupled with a body of the applique on the attachment side thereof such that a portion of the extension member contacts the exterior of the frame member when the coupling feature is engaged; and
assembling the margin seal includes fitting a first side of the U-shaped extrusion within the margin channel and positioning a portion of the extension member and a portion of the frame member edge within an interior of the U-shaped extrusion.

18. The method of claim 16, further including:
assembling at least one threaded fastener through a hole in the frame member and into engagement with a threaded hole on the attachment side of the applique.

19. The method of claim 18, wherein the hole in the frame member is a hole in an insert received within an upper channel of the door.

20. The method of claim 16, wherein the at least one coupling feature is a deformable clip member coupled with the applique that is engaged between the applique and the frame member by deformation under pressure of the movement of the applique toward the frame member so as to fit into a hole in the frame member.

* * * * *